Figure 4:
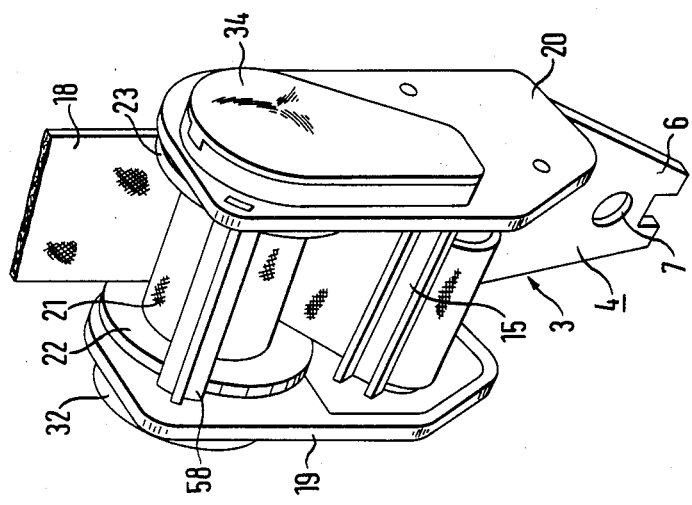

United States Patent [19]

Föhl

[11] Patent Number: 4,667,893
[45] Date of Patent: May 26, 1987

[54] SAFETY BELT TAKEUP MEANS

[75] Inventor: Artur Föhl, Schorndorf, Fed. Rep. of Germany

[73] Assignee: TRW Repa GmbH, Alfdorf, Fed. Rep. of Germany

[21] Appl. No.: 793,169

[22] Filed: Oct. 31, 1985

[30] Foreign Application Priority Data

Nov. 7, 1984 [DE] Fed. Rep. of Germany ....... 3440698

[51] Int. Cl.⁴ ..................... B60R 22/40; B60R 22/42
[52] U.S. Cl. ........................ 242/107.2; 242/107.4 A
[58] Field of Search ............ 242/107.2, 107, 107.4 R, 242/107.4 A, 107.4 B; 280/806; 297/478, 480

[56] References Cited

U.S. PATENT DOCUMENTS 4,230,289  10/1980  Fohl ...................... 242/107.4 B X
4,351,496   9/1982  Fohl ........................ 242/107.4 A
4,371,125   2/1983  Andres et al. ............... 242/107
4,378,915   4/1983  Fohl ......................... 242/107.2
4,451,062   5/1984  Ziv ........................ 242/107.2 X
4,456,195   6/1984  Takada ................... 242/107.4 A X
4,485,985  12/1984  Fohl ......................... 242/107.2

Primary Examiner—John M. Jillions
Attorney, Agent, or Firm—Tarolli, Sundheim & Covell

[57] ABSTRACT

The safety belt takeup means comprises a winding reel receiving the webbing and having a sensor and pawl locking means and combined constructionally therewith a webbing clamping means in which the belt is deflected.

To obtain the smallest possible internal friction in the system the winding reel is mounted easy-running on rolling bearing bodies.

7 Claims, 11 Drawing Figures

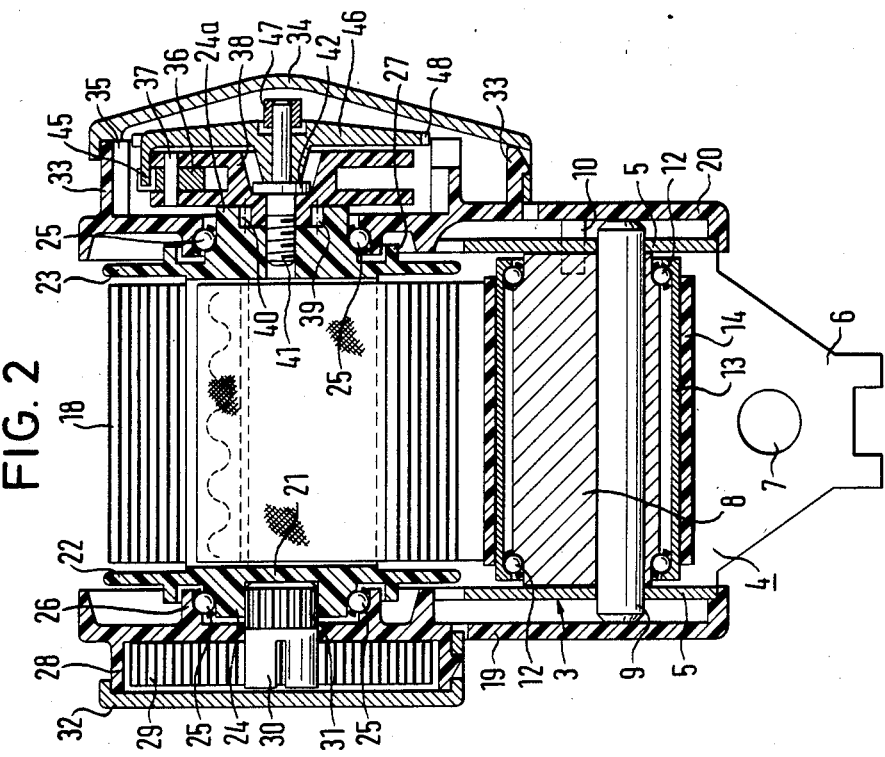
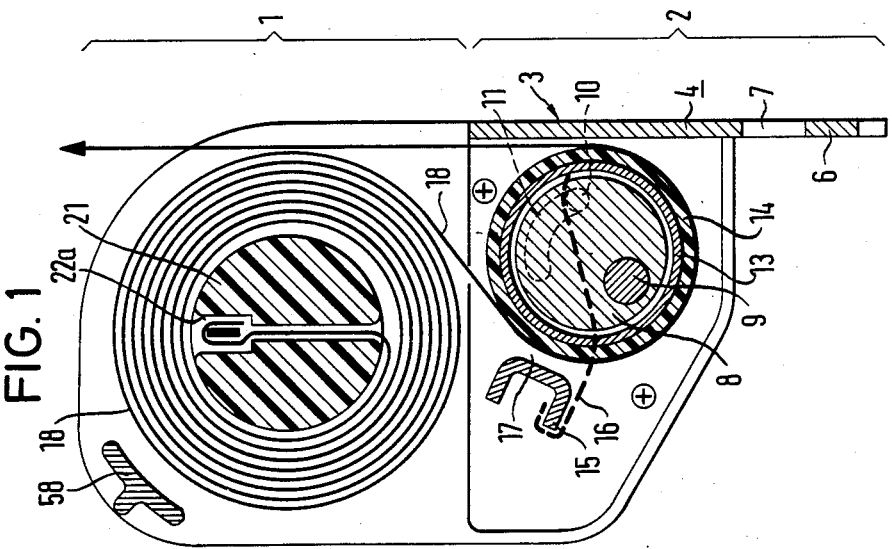

SAFETY BELT TAKEUP MEANS

The present invention relates to a safety belt takeup means comprising a winding reel which is rotatably mounted between side walls of a housing, receives the webbing and is under the influence of a rewinding spring and is adapted to be locked by a vhicle and/or belt-sensitive sensor and a pawl locking means in an emergency, and comprising a following webbing clamping means which is load-bearing in the locking state and in which the webbing is deflected.

In a safety belt takeup means known from U.S. Pat. No. 4,485,985 a webbing clamping mens is provided following an automatic safety belt takeup means with a winding reel for the flexible webbing and a rewinding spring and sensor and a locking mechanism. This clamping means comprises an eccentrically mounted pivotal roll and a sleeve mounted slightly thereon which cooperates with a fitting-fixed clamping face in such a manner that when an elevated force acts, for example after the locking mechanism has come into operation, the deflection member in the form of the roll is pivoted and the webbing is clamped between the clamping face and deflection member whereas in the normal uncoiling movement the deflection member, i.e. the roll, is held by spring force at a distance from the clamping face so that the webbing can pass through without contact. The clamping means is contructionally combined with the takeup mechanism including the locking and release mechanism in a single U-shaped metallic housing. The clamping means serves to eliminate the so-called film reel effect under strong tension at the webbing, i.e. for example in the case of a crash. To actuate the clamping means, a deflection of the webbing within this clamping means is necessary to exert an actuating pulse on the pivotal clamping element after locking of the webbing. In practice this presents problems in that by the additional belt deflection the internal friction of the entire device is increased so that for winding and unwinding of the webbing a relatively strong rewind spring is necessary. This has in practice the disadvantage that in normal operation of the takeup means the webbing force acting on the body of the vehicle occupant and produced by the strong return spring leads to the vehicle occupant being subjected to the relatively strong force of the tightly tensioned belt and then showing an inclination not to fasten the safety belt.

The primary object of the invention is thus to provide a safety belt takeup means of the type defined at the outset wherein the total frictional losses are substantially reduced while a high efficiency and great functional reliability are maintained. A further object of the invention is to provide a safety belt takeup means with reduced overall frictional losses and having a constructional design whereby during assembly safety risks are eliminated as far as possible.

This is achieved according to the invention by a safety belt takeup means wherein the winding reel is mounted easy-running on rolling bearing bodies.

Thus, according to the invention with very simple means in the form of the rolling bearing bodies the mounting of the winding reel is of such low friction that the entire device has a very low internal friction and consequently no overdimensioning of the return spring is necessary. It has been found in practice that in this manner the internal friction can be kept as low as in a safety belt takeup means without webbing clamping means.

Instead the entire periphery of the for example flange-like bearing faces of the winding reel in accordance with a further development of the invention rolling bearing bodies for a support roller mounting are provided for example in the form of at least three bearing rollers which are mounted with very low friction and with small bearing diameter on bearing journals or alternatively in a bearing cage. Preferably, the rolling bearing bodies consist of corrosion-resistant preferably non-metallic material such as glass, ceramic, plastic or the like, so that even after a long time no changes can result in the easy running of the mounting of the winding reel.

In particular, in safety belt takeup means with following clamping means safety and function risks are involved in nonautomatic production in which due to human deficiencies assembly errors cannot be excluded. Such assembly errors may for example be disadvantageous as regards the easy running of the winding reel which is particularly noticeable in the presence of a following clamping means and, as mentioned, can even lead to the user being deterred from fastening the safety belt. Such a safety or function risk is substantially eliminated according to the invention in that the safety belt takeup means is constructionally so designed that it can be produced in completely automatic assembly. By the particular design of the individual parts of the safety belt takeup means it is possible to assemble all parts in one direction, i.e. in axial direction with respect to the winding reel, and this permits the fully automatic assembly. Human inadequancies no longer have any effect and consequently the safety belt takeup means also meets the strictest requirements as regards functional reliability and easy handling.

Further developments of the invention provide a very high degree of functional reliability with simple design and fully automatic production is achieved in that the sensor unit or the part of the sensor unit engaging in the pawl locking mechanism is made resiliently yieldable so that even in tooth-to-tooth position a reliable driving of the pawl locking mechanism is ensured.

Whereas the load-bearing clamping means must be made robust the takeup unit can be made relatively light and of light material because immediately after the locking control phase the clamping mechanism is activated and the entire tensile forces are taken up by the means. Since the clamping means is activated even at low loads, under a load the takeup part is only very slightly loaded.

Figure 3:
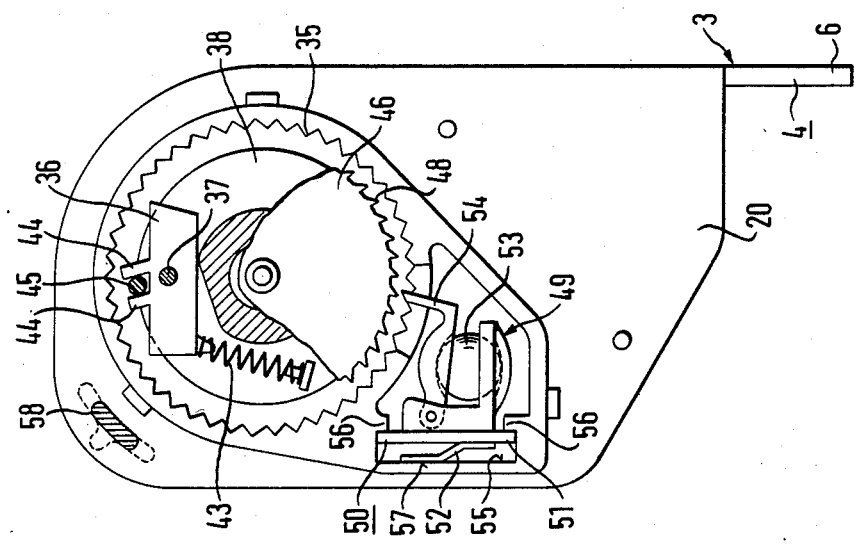
Figure 5:
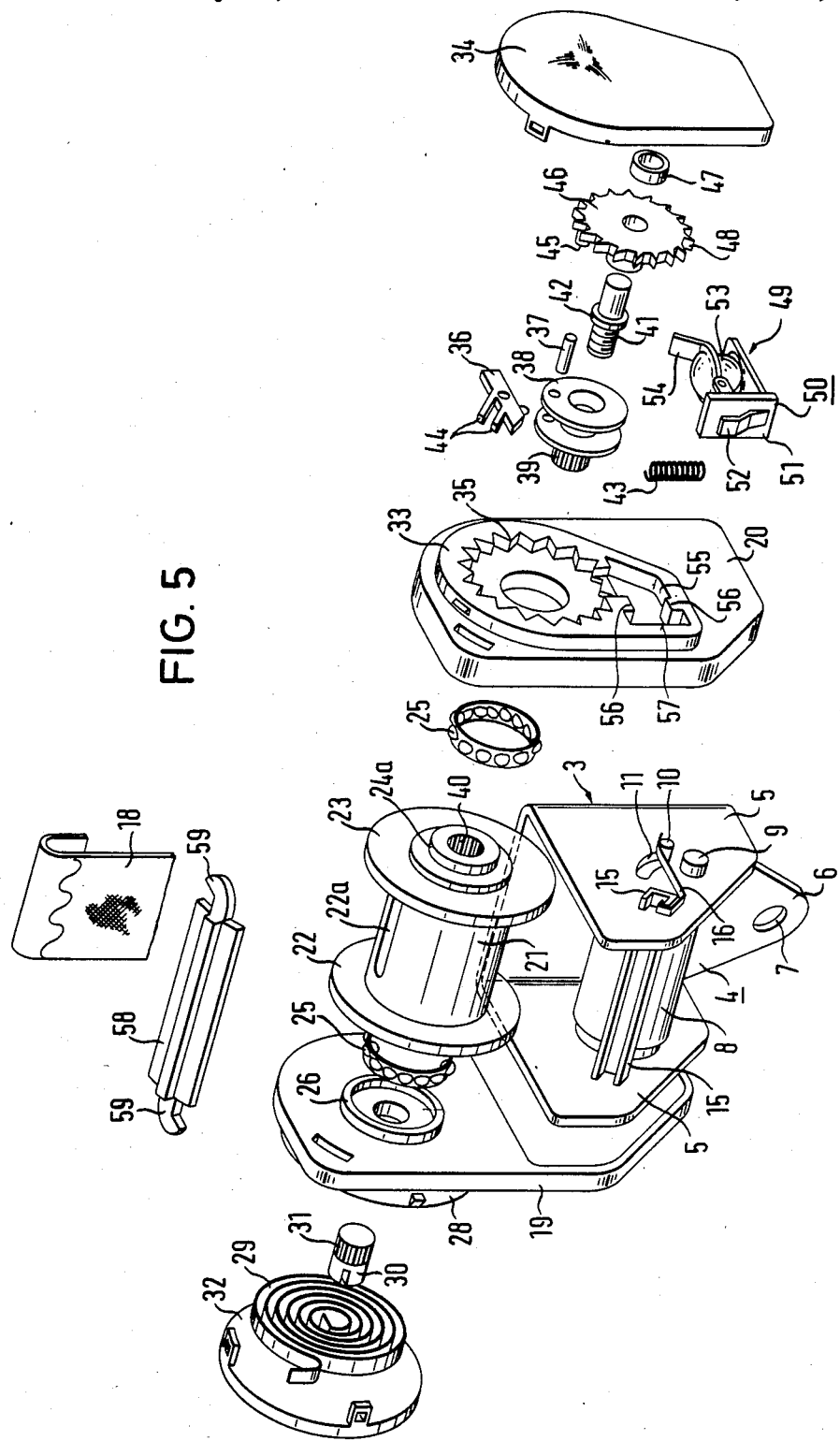
Figure 6:
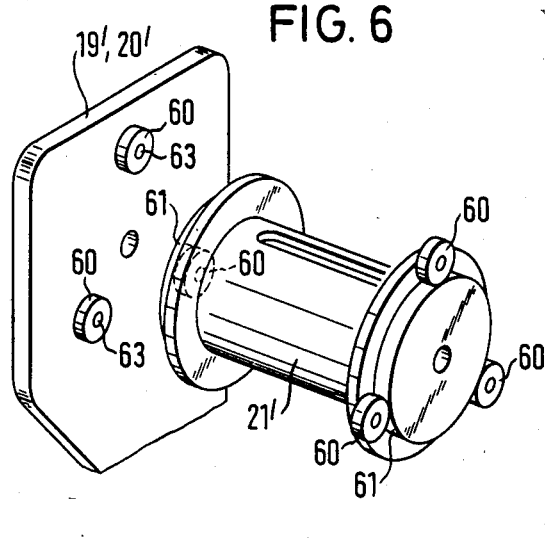
Figure 7:
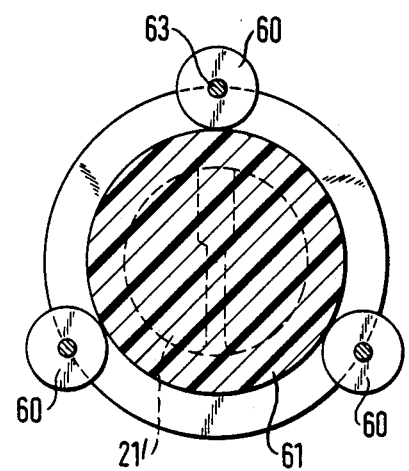

Further advantageous details of the invention will be apparent from the examples of embodiments described below and illustrated in the drawings, wherein:

FIGS. 1 and 2 show the safety belt takeup means in two different sectional views, FIG. 3 is a side view of the safety belt takeup means, FIG. 4 is a perspective illustration of the safety belt takeup means, FIG. 5 is an exploded view of the safety belt takeup means, FIGS. 6 to 11 show different examples of embodiments, with regard to the rolling mounting of the winding reel of the safety belt takeup means.

The safety belt takeup means according to the Figures consists essentially of a takeup unit 1 and a clamping means 2. The base member and assembly base for the entire takeup unit is a metal U-shaped housing 3 consisting of a base plate 4 and two side plates 5. The base plate 4 comprises an extension 6 projecting beyond the side plates 5 and comprising a mounting hole 7 for the securing of the safety belt takeup means to the frame of a motor vehicle. Between the side plates 5 the elements of the clamping means are disposed. Rotatably mounted between the two side plates 5 is a dimensionally stable roller 8 which comprises eccentrically to the axis of rotation a bearing opening and is thereby pivotally mounted on a bearing shaft 9. Secured to at least one end side of the roller 8 is a pin 10 which is led in a slot-like opening 11 in one of the side plates 5. In this manner the roller 8 is pivotal only about a relatively small angular travel. The roller comprises at its end portions antifriction or rolling bearing mountings 12 on which a sleeve-like deflection member 13 is mounted freely rotatably. To increase the friction the deflection member 13 is provided with a resilient covering ring 14. A U-shaped clamping bar 15 is arranged and rigidly secured parallel to the roller 8 between the side plates 5. By a spring 16 mounted on the clamping bar 15 the roller 8 is pressed away from the clamping bar 15 into the position illustrated in FIG. 1 so that between the covering ring 14 and the clamping bar an intermediate space 17 is formed for the free passage of belt webbing 18. By the action of the webbing 18 the roller 8 can be pivoted into the other extreme position in which it is pressed against the clamping bar 15 with interposition of the webbing 18, resulting in the clamping described below. Such a clamping means is illustrated and described in German patent application P 31 24 188.

The aforementioned U-shaped stable housing 3 serves as assembly base for the takeup unit 1 described below. Said takeup unit 1 consists of two side walls 19 and 20 for example in the form of plastic dishes or the like which are fixedly connected for example by clipping to the side plates 5 of the housing 3. Disposed between the side walls 19 and 20 is a winding reel 21 made for example from plastic and comprising flanges 22 and 23 for receiving the flexible belt webbing 18. The winding reel 21 is provided with a receiving slot 22 for securing the belt webbing 18 thereon. At the free flanged ends 23 and 24 of the winding reel 21 rolling bearing bodies in the form of balls 25 mounted in cages are disposed. At the inner sides of the side walls 19 and 20 hub-like projections 26 and 27 are integrally formed which form the outer guides for the rolling bearing bodies 25. The side wall 19 comprises outwardly an annular extension 28 in the space of which a return spring 29 is disposed which is secured to a driver pin 30 on the one hand and to the extension 28 on the other. The driver pin 30 comprises a toothing 31 which in accordance with FIG. 2 engages in form-locking manner and fixed in rotation in a counter toothing at the end 23 of the winding reel 21. Fitted on the extension 28 is a cap-like cover plate 32. In similar fashion the side wall 20 comprises the annular hub-like projections 27 for the external mounting of the rolling bearing bodies 25. Likewise, said side wall 20 comprises an annular extension 33 within which the pawl locking mechanism described hereinafter is disposed and on which a cover plate 34 can be fitted or clipped. As shown in particular by FIGS. 2 and 5, the side walls 19 and 20 project beyond the housing 3 of the clamping means 2 and the individual parts of the takeup unit 1 can be assembled completely automatically in the axial direction of the winding reel 21. The side wall 20 comprises at the inner side of the extension 33 an integrally formed locking toothing 35 which co-operates directly with a pivotally mounted pawl 36. Said pawl is mounted pivotally by means of a bearing journal 37 on a reel-like bearing member 38 for example of plastic which is coupled in form-locking manner and fixed in rotation by means of a toothed driver extension 39 to a corresponding inner toothing 40 of the winding reel 21. For the axial arresting of the bearing member 38 a collar screw 41 is provided which can be screwed to the winding reel 21 and axially arrests the bearing member 38 with the collar 42. By means of a spring 43 the pawl 36 is held in the free position illustrated in FIG. 3. The pawl 36 comprises a forked driver portion 44 in which a pin-like actuating extension 45 of a control disk 46 mounted freely rotatably on the winding axis engages with slight play. The control disk 46 is loosely and freely rotatably mounted on the collar 42 and limited axially by means of a securing ring 47 with slight play. The control disk 46 is provided at the periphery with control teeth 48 which co-operate with a vehicle-sensitive sensor 49 as will be described below. With corresponding mass dimensioning the control disk 46 can act as belt-sensitive sensor as known per se. The vehicle-sensitive sensor comprises a housing 50 which consists for example of plastic and comprises a substantially T-shaped stop plate with spring 52 formed thereon. Mounted in a depression in the housing 50 is an inertia ball 53 on which bears a pawl 54 pivotal in the direction of the control teeth 48. The sensor 49 or its housing 50 is insertable into a recess 55 of the side wall 20 and said recess comprises stop shoulders 56 for supporting the stop plate 51. After insertion of the housing 50 into the recess 55 the spring 52 bears resiliently on the edge 57 of the recess 55. In this manner, during the control operation, i.e. when the inertia ball 53 moves out of its rest position and the locking operation takes place by pivoting of the pawl 54, with for example a tooth-to-tooth position the entire sensor 50 can resiliently yield and adjust itself accordingly. The control disk 46 is thereby blocked and via the actuating extension 45 the pawl 36 is pivoted into the locking position with engagement into the locking toothing 35 against the force of the spring 43. The winding reel 21 is thus immediately stopped and the belt arrested which due to the tensile force of the forwardly-thrust body of the vehicle occupant pivots the roller 8 of the clamping means and produces a clamping after which the takeup unit is relieved practically from all tensile forces and can therefore be made in lightweight construction. Of course, instead of a mechanical sensor an electrical sensor may also be provided. The effect is similar when the belt-sensitive mass sensor in the form of the control disk 46 becomes effective.

The Figures further show that between the side plates 19 and 20 a spacing web 58 is clipped by means of clip elements 59 to said side plates and thereby fixedly connected and by said spacing web the side plates are held exactly at a predetermined spacing.

In FIGS. 6 to 11 some alternative embodiments of the winding reel mounting are shown. In the example of embodiment according to FIGS. 6 and 7 each side wall 19' and 20' comprises for the rolling mounting of the winding reel 21' three rolling bearing bodies 60 in the form of sliding bearing rollers 60' (FIG. 10) or ball bearings 60" (FIG. 11) which are so distributed that they bear slidingly on the flange-like projections 61 of the winding reel 21' as shown in particular in FIG. 7. This is an outer mounting of the winding reel 21' by support rollers.

Figure 8:
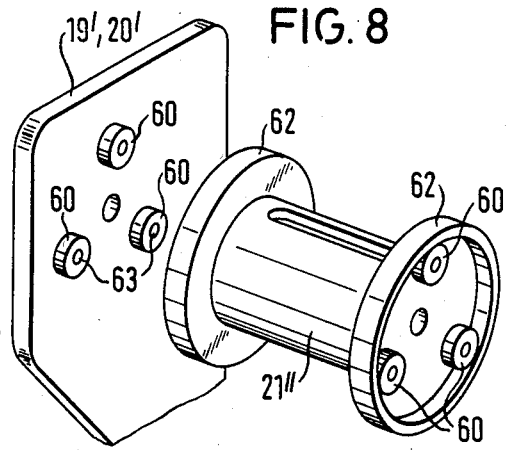
Figure 9:
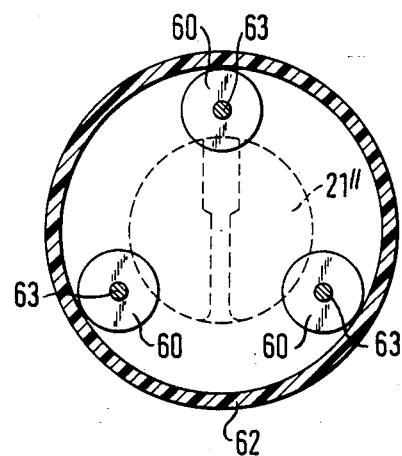
Figure 10:
Figure 11:
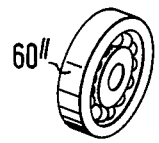

The example of embodiment according to FIGS. 8 and 9 shows a support roller inner mounting, for which purpose the winding reel 21' comprises on both sides a flange extension 62 and in each flange extension in the example of this embodiment three rolling bearing bodies 60 are disposed which may also be constructed in accordance with FIG. 10 or 11. In both examples of embodiments according to FIGS. 6 to 9 the rolling bearing bodies 60 are mounted freely rotatably on bearing journals 63 secured to or integrally formed on the side walls. The diameter of said bearing journals is very small to keep the frictional forces as small as possible.

With regard to corrosion resistance and also the life of the safety belt takeup means with full functionability the rolling bearing bodies according to the examples of embodiments described may be made from non-metallic material, for example glass, ceramic or plastic.

I claim:

1. A safety belt assembly comprising a housing, belt take-up means supported by said housing, belt clamping means supported by said housing and arranged ahead of said belt take-up means, said belt take-up means comprising a winding reel on which belt webbing is wound and which is rotatably supported by said housing for rotation in webbing unwinding and winding directions, a rewinding spring for biasing said winding reel in the webbing winding direction, pawl locking means for locking said winding reel against rotation in response to an emergency, and emergency sensor means for controlling actuation of said pawl locking means, said housing comprising a housing part for supporting said belt clamping means and opposite side walls connected, respectively, to opposite portions of said housing part and extending beyond said housing part, the portions of said side walls projecting beyond said housing part to support said belt take-up means, one of said opposite side walls carrying said rewinding spring and the other of said opposite side walls carrying said emergency sensor means and said pawl locking means.

2. A safety belt assembly as set forth in claim 1 wherein said housing part is U-shaped and said opposite side walls are connected to opposite legs of said U-shaped housing part.

3. A safety belt assembly as set forth in claim 2 wherein said one and said other opposite side walls carry rolling bearing bodies for rotatably supporting said winding reel.

4. A safety belt assembly as set forth in claim 1 wherein said other of said opposite side walls has a recess for receiving said emergency sensor means therein.

5. A safety belt assembly as set forth in claim 1 wherein said winding reel has a driving extension attached thereto for supporting a bearing member carrying said pawl locking means thereon, said other side wall has locking toothing thereon engageable with said pawl locking means, and said safety belt assembly further comprises a control member for actuating said pawl locking means.

6. A safety belt assembly as set forth in claim 1 wherein said opposite side walls are made of aluminum or plastic.

7. A safety belt assembly as set forth in claim 4 wherein the emergency sensor means comprises a casing which is resiliently mounted in said recess for receiving said sensor means, said casing comprising an integrally formed spring which is supported in said recess and engages a surface of said recess for biasing said casing against another surface of said recess to retain said emergency sensor means in said recess.

* * * * *